United States Patent [19]

Erik et al.

[11] 3,716,318
[45] Feb. 13, 1973

[54] VALVING MEANS FOR INJECTION MOLDING APPARATUS

[75] Inventors: Carl L. Erik, Warren; William J. Scott, Warminster, both of Pa.

[73] Assignee: GTE Sylvania Incorporated, Secena Falls, N.Y.

[22] Filed: Feb. 4, 1971

[21] Appl. No.: 112,627

[52] U.S. Cl. .................................................425/245
[51] Int. Cl. .................................................B29f 1/04
[58] Field of Search......18/30 R, 30 NY, 30 NM, 30 NA,
18/30 NB, 30 NH, 30 NP, 30 NT, 30 NV, 30 NW, 30 NS, 30 NX, 30 NZ; 425/242, 244, 245, 252, 251, 247

[56] References Cited

UNITED STATES PATENTS

| 3,024,498 | 3/1962 | Bronnenkant et al.............18/30 RV |
| 2,878,515 | 3/1959 | Strauss.............................18/30 RV |
| 2,770,011 | 11/1956 | Kelly..............................18/30 RV |
| 2,773,284 | 12/1956 | Kelly..............................18/30 RV |
| 2,865,050 | 12/1958 | Strauss............................18/30 RV |
| 2,912,719 | 11/1959 | Gilmore et al...............18/30 RV UX |
| 3,077,636 | 2/1963 | Peters.............................18/12 B X |
| 3,132,197 | 5/1964 | Peters et al...................18/30 NA UX |
| 3,231,938 | 2/1966 | Seymour..........................18/30 NH |
| 3,488,810 | 1/1970 | Guellert........................18/30 RV X |

*Primary Examiner*—J. Spencer Overholser
*Assistant Examiner*—Michael O. Sutton
*Attorney*—Norman J. O'Malley, Donald R. Castle and William H. McNeill

[57] ABSTRACT

An improved valving means for an injection molding apparatus having first and second chambers located within a substantially cylindrically shaped body and separated by a restricting means. An elongated rod member, adapted to move within both chambers, has at one end a male tip which controls the amount of flow of molten material from the exit end of the first chamber. At the other end of the rod member is attached a piston, this piston moving within the second chamber as a result of altering fluid pressures exerted on both sides of the piston.

7 Claims, 3 Drawing Figures

INVENTORS.
CARL L. ERIK &
WILLIAM J. SCOTT

BY

ATTORNEY

VALVING MEANS FOR INJECTION MOLDING APPARATUS

BACKGROUND OF THE INVENTION

This invention relates to apparatus for injection molding and more particularly to an air or hydraulically operated valving means for runnerless molding.

It is often customary in injection molding procedures to employ a housing manifold which receives a steady flow of molten material from a source under constant pressure. Upon receiving the molten material, the housing manifold distributes it through designated passageways to a plurality of individual valves from where it is introduced into a corresponding number of mold cavities. This procedure makes it possible to mold several articles in one operation of the mold apparatus.

The valves which receive the molten material are most usually of the spring loaded type, which depend on the injection pressure of the press of the apparatus to operate, or the air-operated type, which depend on a linkage or lever mechanism to actuate the valve. In the case regarding the spring loaded valve, it has been the spring itself which has failed after continuous operation, whereas with the air operated type, there is the problem of a complex mechanism which is most usually positioned outside the valve body, thereby making it vulnerable to possible damage by either the operator or other external means. An additional problem regarding valves of the two types previously described is that in most cases, the tips of these valves are fixed, thus making it necessary to replace practically the entire valve unit, should one tip break.

It is believed, therefore, that an injection molding apparatus having fluid-operated valving means located therein which function without the need for springs or externally positioned complex mechanisms would be an advancement in the art.

OBJECTS AND SUMMARY OF THE INVENTION

Consequently, it is a primary object of this invention to provide an improved valving means for injection molding which obviates the previously mentioned disadvantages of the prior art.

It is a further object of this invention to provide a valving means for injection molding apparatus which facilitates ease of operation.

A still further object of the invention is to provide a valving means for injection molding apparatus which is easily constructed and disassembled, thereby making replacement of components, as well as cleaning, much easier.

In accordance with one aspect of this invention, there is provided an improved valving means for controlling the rate of flow of molten material. A plurality of these valving means are positioned within a housing manifold which has a centrally located receiving means. Molten material enters this receiving means from a supply reservoir which is under constant pressure, and is transported to each of the valving means through designated passageways within the manifold. Each valving means, which has a substantially cylindrically shaped body, has a first and second chamber located therein, each separated from the other by a restricting means. An elongated rod, adapted to move within both chambers concurrently, has at one end a male tip, and at the other an attached piston member, the piston member moving within the second chamber, while the male tip's movement is restricted to the first chamber. At one end of the first chamber is located an entrance port which aligns with the passageways within the manifold to receive the molten material. At the other end of the first chamber is located an exit port, through which the molten material is finally dispensed. This exit port is adapted to fit securely within a receptive port within the cavity member of the molding apparatus. The amount of material allowed out of the exit port is controlled by the male tip of the rod member, which mates with a female opening within the receptive port. It is withdrawn from and inserted into this opening by altering fluid pressures acting against the piston member within the second chamber, which, being attached to the rod member, causes this motion.

DESCRIPTION OF THE PREFERRED EMBODIMENTS

For a better understanding of the present invention, together with other and further objects, advantages, and capabilities thereof, reference is made to the following specification and appended claims in connection with the following drawings.

Figure 1:
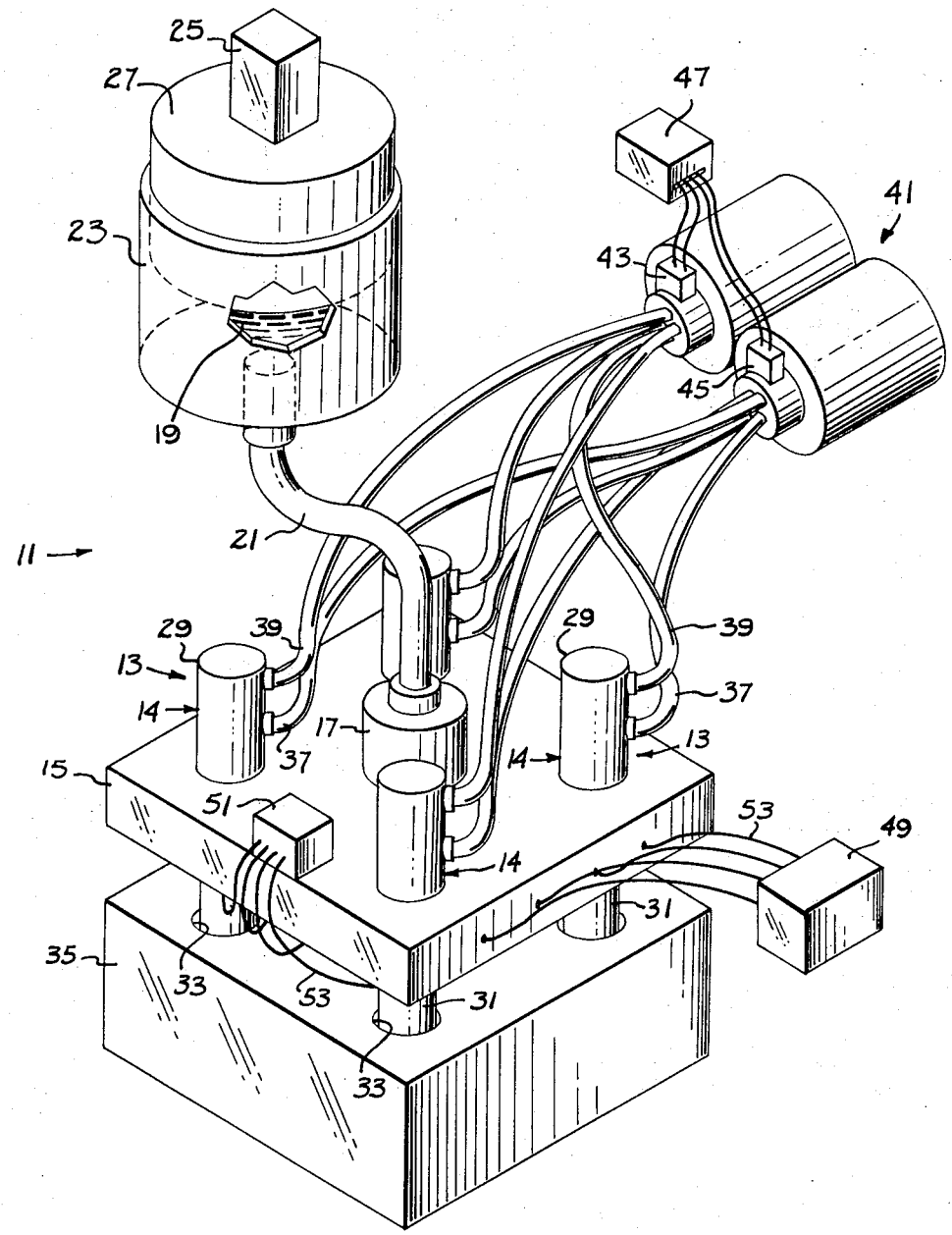
FIG. 1 is an isometric view of the entire injection molding apparatus employing the present invention.

Referring first to FIG. 1, there is shown an isometric view of an injection molding apparatus 11 employing the present invention, valving means 13, each comprising a substantially cylindrically shaped body 14. A plurality of these valving means, (in this particular embodiment there are four), are positioned within housing manifold 15 and about a centrally located receiving means 17. Molten material 19, which is fed into receiving means 17 through pipe 21, is housed in supply reservoir 23 and is under constant pressure (as depicted by load 25 resting atop press 27, which forces down against the molten material 19). The material enters receiving means 17 and from there is dispensed to each of the valving means 13 through designated passageways (shown in FIG. 2 and 3) within the housing manifold.

Each valving means 13, has an upper portion 29 which extends above the upper surface of housing manifold 15, and a corresponding lower portion 31 which extends below the under surface of the manifold, and mates with a corresponding receptive port 33 located within cavity member 35.

Attached to each valving means are first and second pressure hoses 37 and 39, respectively. These pressure hoses are, in turn, connected to a fluid pressure source 41 which alters pressure accordingly within upper portion 29 of the valving means. A more detailed description of this operation will be given with the explanation of FIGS. 2 and 3. Alternation of the fluid pressure is controlled by switching means 43 and 45 which are, in turn, controlled by a timer mechanism 47, which is set according to the operating cycle of the molding apparatus. To assure that the molten material does not cool sufficiently to become sluggish and possibly clog the valve mechanism or housing manifold passages, it is necessary to provide a method for supplying heat to these components. Although other methods are possible, the method using several high resistance wires 53 embedded within the manifold 15 and lower portion 31 of valving means 13 and connected to potential sources 49 and 51, respectively, is employed here.

Figure 2:
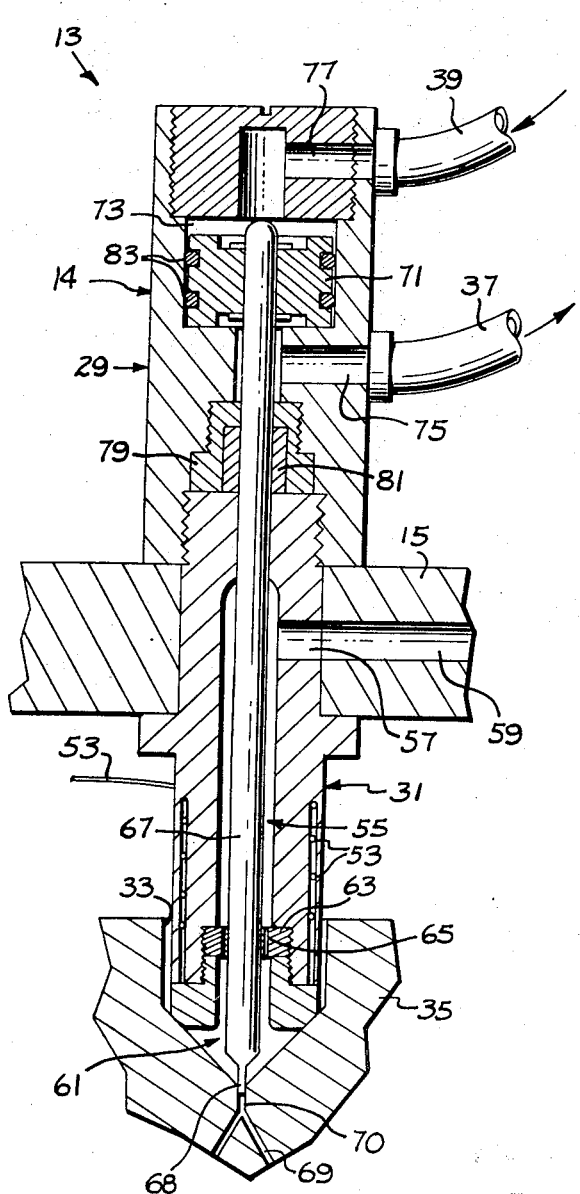
FIG. 2 is an elevational view, in section, of the present invention in its closed position.

In FIG. 2 can be seen the substantially cylindrically shaped body 14 of valving means 13, as the valving means appears in the closed position, or the position in which molten material is refused entry into the mold cavity. Lower portion 31 fits securely within receptive port 33 of cavity member 35 and remains in this position throughout the molding operation. Located within lower portion 31 is first chamber 55, which has at one end an entrance port 57, which, in turn, aligns with designated passageway 59 in housing manifold 15. At the opposing end of first chamber 55 is exit port 61, in which is located restrictive washer 63 having several circumferential holes 65 therein. The size of these circumferential holes as well as the duration of the timed cycle determines the amount of material allowed into the cavity member 35. Should the need exist for more material, due to a change in cavity members, washer 63 may be easily removed and replaced by one having larger holes.

With the valving means closed, flow of molten material into mold passages 69 of cavity member 35 is blocked by elongated rod member 67 which has a male tip 68 which, in turn, mates with female opening 70 in the cavity member. To allow passage of material, male tip 68 is withdrawn. This motion is the result of fluid pressure changes effected against piston 71, attached at the other end of elongated rod member 67, and adapted to move within second chamber 73, located within upper portion 29. At one end of second chamber 73 is first pressure port 75 while at the other end is second pressure port 77. Pressure ports 75 and 77 are attached to pressure hoses 37 and 39, respectively, which are joined to fluid pressure source 41 (shown in FIG. 1). To effect a closed position of the valving means, switching means 43 (shown in FIG. 1) actuates fluid pressure to second pressure port 77 forcing piston 71 down. That fluid within first pressure port 75 escapes through first pressure hose 37. To assure that this fluid does only escape through hose 37, and not into first chamber 55, a packing gland member 79 having high temperature packing material 81 encased therein is placed between the two chambers. These serve a dual purpose as a restricting means in that they also do not allow molten material up into second chamber 73. To also assure that a good compression fit is achieved by the piston 71 within second chamber 73, a pair of seal rings 83 encompass the piston body.

Figure 3:
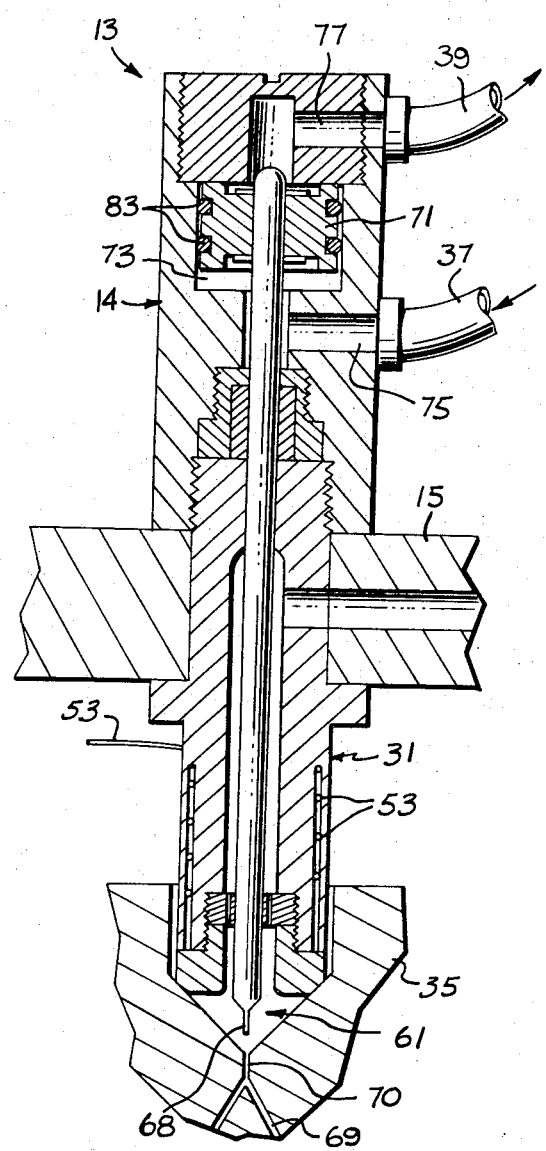
FIG. 3 is an elevational view, in section, of the present invention in its open position.

In FIG. 3, the valving means 13 is shown in the open position. This is accomplished by altering the pressure within the pressure ports 75 and 77. To do this, switching means 45 (shown in FIG. 1) actuates fluid pressure to first pressure port 75. At the same time, switching means 43 relieves the pressure on second pressure port 77, allowing the fluid to escape through hose 39. The higher pressure in port 75 forces piston 71 upward within second chamber 73, causing male tip 68 to be withdrawn from female opening 70 within cavity member 35. When the proper amount of molten material has entered the cavity member, the procedure for closing, as explained previously, is initiated once again.

A further advantage to the valving means described above is the ease with which it may be cleaned. To accomplish this, lower portion 31 is unscrewed from upper portion 29, withdrawn from housing manifold 15, dumped of excessive material, and cleaned. It is then replaced in the same manner.

High resistance wires 53 are more clearly shown in FIGS. 2 and 3 in their respective positions within lower portion 31.

It can be seen therefore, that the previously described invention substantially eliminates the disadvantages of valving means of the prior art by omitting the need for springs or externally located mechanisms. Cleaning, assembly, and disassembly in the event of repair are made much easier because of its basically simple design.

While there have been show and described what are presently considered the preferred embodiments of this invention, it is obvious to those skilled in the art that various changes and modifications may be made therein without departing from the scope of the invention as defined by the following claims.

We claim:

1. In an injection molding apparatus having a housing manifold having means located therein for receiving a quantity of molten material, said molten material being transported from said receiving means through designated passages within said manifold, and means for heating said molten material during operation of said molding apparatus, a supply reservoir of molten material having pressure means connected thereto and being directly connected to said receiving means located within said housing manifold, a cavity member having a plurality of receptive ports located therein, the improvement comprising:

a plurality of valving means positioned within said housing manifold and connected to said passages within said manifold, and having means for heating said material during operation of said apparatus;

a fluid pressure source joined to each of said valving means, each of said valving means having a substantially cylindrically shaped body having a first and second chamber located therein, an elongated rod member having first and second opposing end portions and adapted to move within said first and second chamber, said first chamber having at one end an entrance port connected to one of said designated passages within said housing manifold, and at the other end an exit port which aligns with and connects to one of said receptive ports within said cavity member, said elongated rod member having a piston attached at said second opposing end, said piston adapted for moving within said second chamber, said second chamber being joined at one end to a first pressure port and at the other end to a second pressure port, said first and second pressure ports being attached to said fluid pressure source, thereby causing said piston to move within said second chamber when pressure is altered on said first and second pressure ports by said pressure source.

2. The invention according to claim 1 in which said pressure source is controlled by a switching means operated in conjunction with a predetermined schedule as defined by the operating cycle of the molding operation.

3. The invention according to claim 1 in which a restricting means is positioned between said first and second chamber, said restricting means thereby substantially eliminating the flow of fluid of said fluid pressure source from entering said first chamber.

4. The invention according to claim 3 in which said restricting means comprises a quantity of packing material, said packing material being encased within a packing gland member.

5. The invention according to claim 1 in which said piston attached to said second opposing end of said elongated rod member is encompassed by at least one seal ring, said seal ring thereby substantially eliminating any exchange of fluid of said fluid pressure source between said first and second pressure ports.

6. The invention according to claim 1 in which said first opposing end portion of said elongated rod member comprises a protruding male tip, said male tip adapted to mate with a corresponding female opening within one of said receptive ports within said cavity member, said protruding male tip thereby controlling the flow of molten material into said cavity member.

7. The invention according to claim 1 in which said exit port of said first chamber is fitted with a restrictive washer, said washer having a plurality of circumferential holes located therein for controlling the flow of said molten material from said first chamber to said receptive port within said cavity member.

* * * * *